Figure 1:
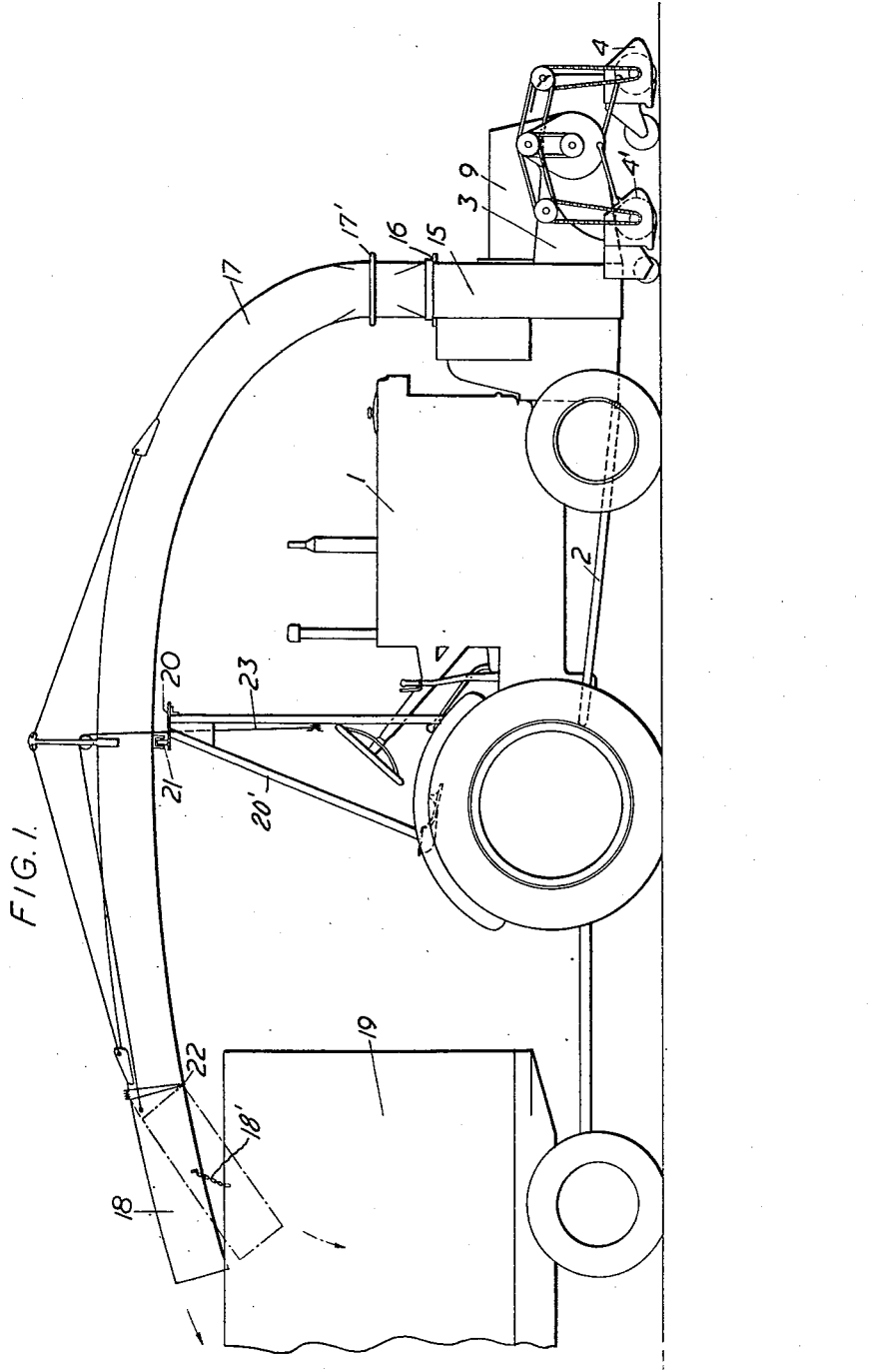

Oct. 29, 1957      E. W. BORROW      2,811,004

ROTATING CUTTING REEL TYPE FORAGE HARVESTER

Filed July 1, 1955      3 Sheets-Sheet 1

Inventor
EDGAR W. BORROW

Oct. 29, 1957 E. W. BORROW 2,811,004
ROTATING CUTTING REEL TYPE FORAGE HARVESTER
Filed July 1, 1955 3 Sheets-Sheet 2

Inventor
EDGAR W. BORROW

Oct. 29, 1957 E. W. BORROW 2,811,004
ROTATING CUTTING REEL TYPE FORAGE HARVESTER
Filed July 1, 1955 3 Sheets-Sheet 3
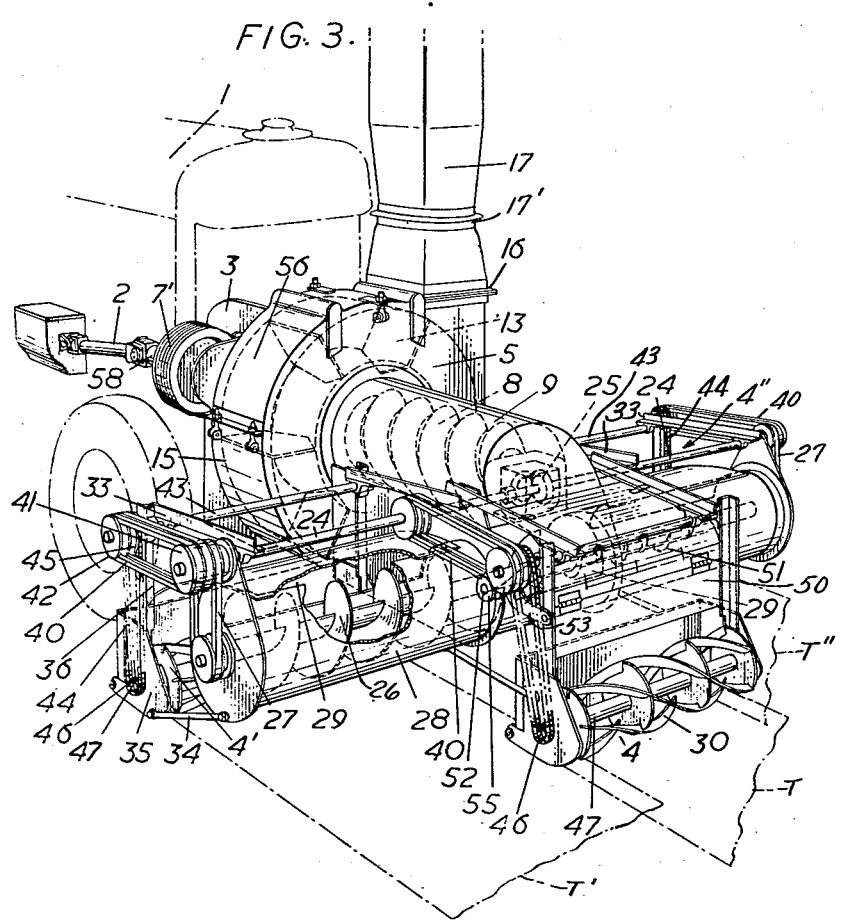
Inventor
EDGAR W. BORROW
By
Attorney

United States Patent Office 2,811,004
Patented Oct. 29, 1957

2,811,004

ROTATING CUTTING REEL TYPE FORAGE HARVESTER

Edgar Wilfred Borrow, Portsmouth, England

Application July 1, 1955, Serial No. 519,470

Claims priority, application Great Britain July 3, 1954

6 Claims. (Cl. 56—24)

This invention relates to forage harvester machines for mowing grass and similar agricultural crops, hereinafter referred to as grass. It is particularly but not essentially concerned with machines for mowing large expanses of grass such as aerodromes, sports grounds, and the like, and preferably also removing and collecting the mowed grass.

From one aspect, the invention provides for the cutting of grass by one or more cutters mounted in a frame at the front of a tractor and driven from the power take-off shaft of the tractor, and conveying the cut grass to a fan by which it is blown through a duct extending over the tractor and delivered to a trailer drawn by the tractor.

From another aspect, a machine in accordance with the invention comprises at least one cutter mounted in a frame in front of a tractor, a worm conveyor arranged longitudinally of the frame, means for directing the cut grass from the cutters to this conveyor, a fan to which the grass is delivered by the conveyor and ducting extending over the tractor through which the cut grass is blown by the fan and delivered into a trailer drawn by the tractor. The cutters, conveying means and fan are all driven from the power take-off shaft of the tractor.

According to another feature of the invention, the worm conveyor compresses the grass and pushes it through perforations in a casing enclosing the worm against rotary knives whereby the grass is chopped into short lengths before delivery to the fan.

While any suitable cutting bars or mower units may be employed, depending primarily upon the type of crop to be harvested, preferably rotary grass-cutters arranged in a plurality of rows are used with the tracks of the cutters in one row overlapping those of the cutters in the adjacent row. In this case, the cut grass may be guided by deflector plates (and preferably by rotary helical worms) to transverse conveyors, preferably of the worm type, which carry the grass to the centre from each side and deliver it to the longitudinal worm conveyor.

The cutters are preferably supported on parallel link mechanisms (comprising four-bar chains) so that they will rise and fall to follow undulations in the ground. These link mechanisms may be connected by chains or the like to the hydraulic lift of the tractor so that they may be raised clear of the ground when desired. The drive to the rotary cutters may be by endless belts running parallel to two of the links of the parallel link mechanism.

Provision is made to ensure that the ducting remains with its delivery end over the trailer as the trailer and tractor axes move relatively to each other when the machine is steered. An arcuate track may be mounted transversely on the tractor and the ducting is supported on this track by a roller. The ducting is pivotable about a vertical axis at its front end so that as the tractor turns during steering, the ducting moves along the track so as to maintain its rear end over the trailer.

The rear end of the ducting is articulated about a horizontal axis so that it may be raised or lowered to deliver the grass into the rear or forward end of the trailer.

Figure 2:
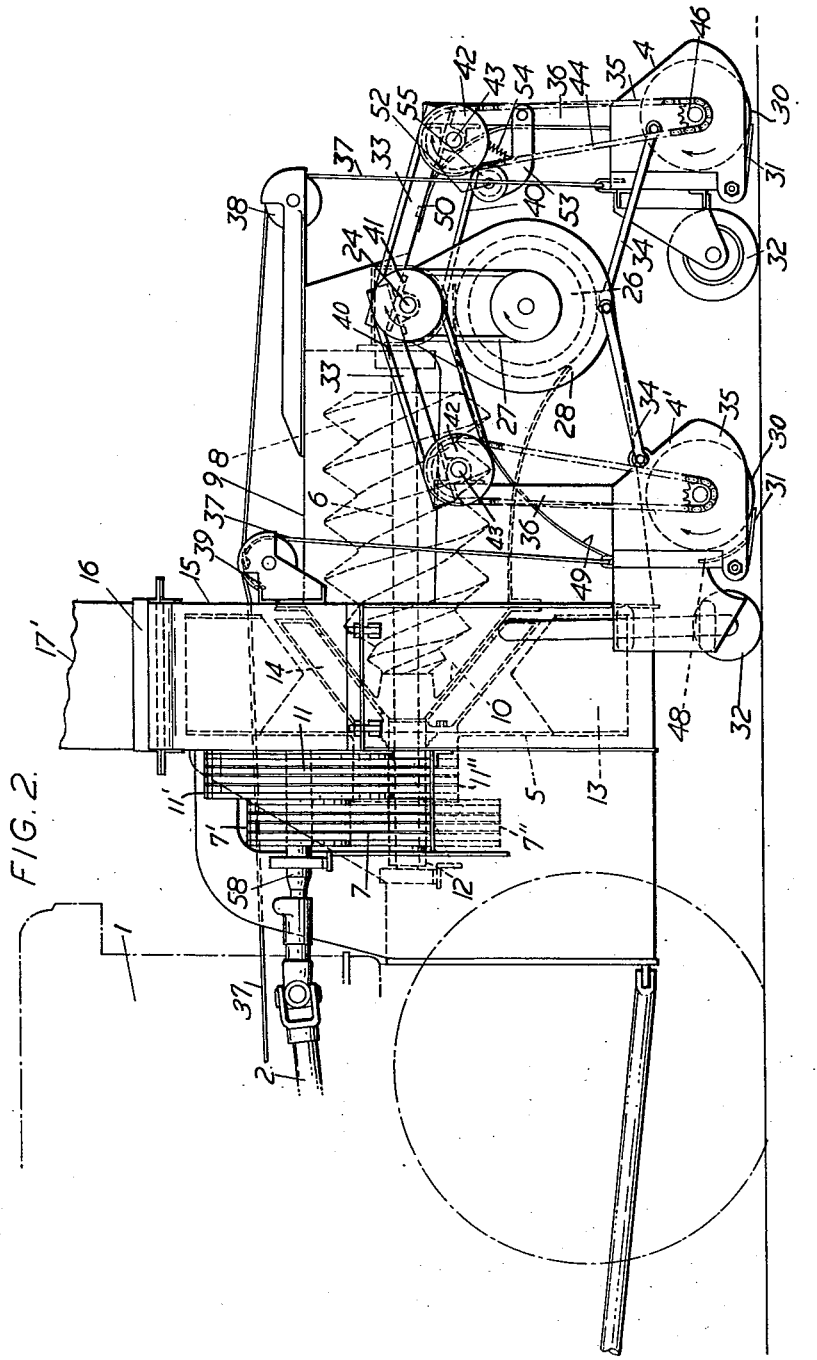

Other parts of the invention are embodied in the preferred form of the invention which will now be described in some detail by way of example with reference to the accompanying drawings in which Fig. 1 is a side view in elevation of a machine in accordance with the invention, Fig. 2 is an enlarged side view in elevation and showing detail of the mowers and the means for conveying the cut grass to the ducting and, Fig. 3 is a perspective view of the parts shown in Fig. 2, with parts omitted for clearness.

In this form, the tractor 1 itself is of a conventional type having a power take-off shaft 2 rotating at about 520 R. P. M. and hydraulic lift mechanism (not shown).

Mounted on the front of the tractor 1, by any suitable connecting means, is a rigid frame 3 from which a plurality of cutter units 4, 4', 4" are supported and in which are mounted means for conveying grass cut by the cutter units 4 to a fan 5, also mounted in the rigid frame 3.

A central longitudinal shaft 6 supported in bearings in the frame 3 is driven by V-belts 7 from a main drive shaft 58 which is directly driven by the power take-off shaft 2, the belts 7 being trained around pulleys 7' and 7" on the shafts 58 and 6, respectively. This longitudinal shaft is rotated at about 270 R. P. M.

The central shaft 6 constitutes the feed shaft of a forage chopper of the type shown in my Patent No. 2,754,750 and, as shown in this patent, on this longitudinal shaft 6 is rigidly mounted a worm conveyor 8 enclosed in a fixed casing 9 and arranged to deliver rearwardly. The rear end 10 of this casing is conical and is perforated. Rotatably mounted on the longitudinal shaft 6 is a pulley 11" which is driven by belts 11 from a pulley 11' on the main drive shaft 58 at about 1000 R. P. M. This pulley 11" is fixed with a hollow shaft 12 rotatably mounted on the shaft 6 and supporting a number of fan blades 13 and a number of knife blades 14 which lie contiguous to the outer surface of the conical end 10 of the casing.

The conical end 10 of the casing 9, the knives 14 and the fan blades 15 are enclosed in a fan casing 15 having an upwardly directed outlet 16 which is connected by a swivel unit 17' to a ducting 17 which extends rearwardly over the top of the tractor 1, its rear end 18 overhanging a trailer 19 drawn in the usual way by the tractor 1. The rear end 18 is loosely positioned more or less centrally of the trailer 19 by ropes, chains or the like 18' and to accommodate this relative fixed position of the end 18, the ducting 17 can swivel in a horizontal plane about the outlet 16 by means of the swivel unit 17' when the equipment is making turns or other deviations in its course of travel.

In view of the length of the ducting 17, conveniently it may be supported above the tractor 1 (at about the driver's position) by a frame 20' mounted on the tractor and carrying a track 20 on which runs a roller means 21 mounted on the bottom of the ducting 17. As the tractor axis moves relatively to the axis of the trailer, the ducting 17 swivels by means of the swivel unit 17' about the outlet 16 of the fan casing 15, the roller means 21 running in an arcuate path along the track 20, so that the rear end 18 of the ducting remains over the centre of the trailer.

The rear portion 18 of the ducting is hinged to the rest of the ducting 17 about a horizontal axis 22 and may be raised or lowered by ropes, chains or the like 23 within reach of the tractor driver so that the ducting 17 may deliver at the rear end or front end of the trailer 19 as may be required. The anchoring ropes or chains 18' are sufficiently loose to enable this vertical adjustment of the end 18.

Transverse shafts 24 extend from the centre of frame 3 to each side of the machine and these shafts are driven from the forward end of the longitudinal shaft 6 by bevel gearing 25 of one-to-one ratio. Mounted below these shafts are transverse worm conveyors 26, driven by V-belts 27 from the transverse shafts 24 and arranged so that each delivers inwardly towards the centre and so to the longitudinal worm conveyor 8. The transverse conveyors are enclosed in casings 28 having longitudinal slots 29 therein through which grass may be delivered to the worms.

The cutting units may be of substantially conventional form, each comprising rotary helical knives 30, a cutter bar 31 and a back roller 32 by which the height of the cutters above the ground may be adjusted. In the preferred form, three cutter units 4, 4', 4" are provided, one centrally at the front and the other two, one on each side with the tracks T', T" of the rear cutter units overlapping the track T of the front unit.

Each cutter unit is supported from the frame 3 by parallel link mechanism comprising a top link 33 pivoted about the axis of the transverse shaft 24, a parallel link 34 pivotally connected to the casing 28 of the transverse conveyor 26 and to the frame 35 of the cutter unit and a vertical link 36 pivotally connected to the first link 33 and to the frame 35 of the cutter unit. The cutter unit can thus rise and fall as demanded by undulations in the ground being mown. A rope, chain or the like 37 is connected to each cutter unit and led by pulleys 38, 39 to the tractor so that the cutter units may be raised clear of the ground when desired.

The rotary cutters are driven by V-belts from the transverse shaft 24. One V-belt 40 is driven from a pulley 41 on the transverse shaft 24 and drives a pulley 42 on a shaft 43 forming the pivotal connection between the top link 33 and vertical link 36 of the parallel link mechanism. A chain 44 is driven by a sprocket 45 on this pivot shaft 43 and drives a sprocket 46 on the shaft 47 of the rotary cutters 30. Alternatively a belt and pulley drive may be used to the rotary cutters.

The rear cutters throw the grass, as it is cut, upwardly and forwardly and curved deflecting plates 48, 49 are provided to direct the grass through the opening 29 in the casing 28 surrounding the transverse worm conveyor 26. The front cutter also throws the grass upwardly and forwardly and it is necessary to direct the grass backwardly for delivery to the transverse conveyor 26 through a suitable slot, not shown. This is achieved partly by a deflector plate 50 and partly by a helical-blade rotor 51 mounted on a shaft 52 supported in pivoted brackets 53. These brackets 53 are sprung upwardly by tension springs 54 so as to maintain a pulley 55 on the rotor shaft 52 in contact with the underside of the V-belt 40 driven from the transverse shaft 24.

The operation of the machine should now be clear. The grass cut by the rotary cutter units is directed by the respective reflecting means and the bladed rotor into the transverse worms 26 which convey it to the centre. Here it is delivered to the longitudinal conveyor 8 which conveys it rearwardly and delivers it through the perforated end casing 10 to the rotary knives 14. The knives chop the grass into short lengths which are delivered on to the fan blades 13 and propelled and blown by them through the ducting 17 to the trailer 19.

The fan casing 15 is provided with doors 56 in its circumferential wall by which access may be had to the rotary knives 14. These knives may be removed when it is not desired to chop the cut grass but to deliver the grass as cut to the trailer.

It will be understood that the invention is not restricted to the details of the preferred form described which may be modified without departure from the broad ideas underlying them.

I claim:

1. A grass cutting machine comprising a frame having means for mounting said frame on the front of a tractor and extending forwardly thereof, a gang of rotary mower units mounted on said frame transversely thereof and disposed in overlapping relation, said units being disposed in front of the tractor for cutting the grass in a wide swath, casing means mounted on said frame transversely thereof and provided with longitudinal slots, guide means on said frame directing the cut grass from the rotary mower units to the slots into said transverse casing means, helical conveyors in said casing means conveying the cut grass to the central portion of the casing means, a casing mounted longitudinally of said frame and having connection with the transverse casing means for receiving the cut grass from the transverse casing means, a worm conveyor in said longitudinal casing, a fan unit on said frame and having an inlet for receiving cut grass from said longitudinal conveyor and for blowing the cut grass to a remote point, a main drive shaft journaled on said frame and having means for connection to the power take-off of the tractor, and drive means connecting said main drive shaft with said mower units, conveyor means and fan unit.

2. A grass cutting machine as defined in claim 1 including a duct connected to the fan unit and extending rearwardly of said frame, said duct being of a length to extend beyond the tractor to discharge the cut grass into a trailer drawn by the tractor.

3. A grass cutting machine as set forth in claim 2 including a swivel unit connecting said duct with the outlet of said fan unit, and means for connecting the free end of said duct to the trailer to cause said duct to swivel with the free end following the tractor during turns.

4. A grass cutting machine as set forth in claim 2 including an auxiliary frame mountable on the tractor, a track mounted on the upper end portion of said auxiliary frame, and roller means on said duct and running on said track to support said duct intermediate its length and accommodate the swiveling movement of said duct.

5. A grass cutting machine as defined in claim 1 including a discharge section hinged on the free end of said duct for vertical adjustment, and control means connected with said discharge section and extending along said duct and down to the operator's position.

6. A grass cutting machine as set forth in claim 1 wherein the guide means include curved deflector plates associated with each rotary mower unit.

References Cited in the file of this patent

UNITED STATES PATENTS

| 1,799,033 | Willerton | Mar. 31, 1931 |
| 2,349,386 | Stoetzl et al. | May 23, 1944 |
| 2,653,350 | Piperoux | Sept. 29, 1953 |
| 2,694,891 | Brown | Nov. 23, 1954 |
| 2,724,227 | Godwin | Nov. 22, 1955 |

FOREIGN PATENTS

| 260,241 | Switzerland | July 16, 1949 |
| 676,380 | Great Britain | July 23, 1952 |
| 720,491 | Great Britain | Dec. 22, 1954 |